United States Patent
Bagg et al.

(10) Patent No.: US 6,341,358 B1
(45) Date of Patent: Jan. 22, 2002

(54) INTEGRITY TESTER FOR PARALLEL SIGNAL BUS

(75) Inventors: Charles Bagg, Fitchburg; William Ham, Andover, both of MA (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/152,824

(22) Filed: Sep. 14, 1998

(51) Int. Cl.$^7$ .................................................. H02H 3/05
(52) U.S. Cl. ......................... 714/43; 324/542; 324/539
(58) Field of Search ........................... 714/43; 324/539, 324/542

(56) References Cited

U.S. PATENT DOCUMENTS

| | | | | |
|---|---|---|---|---|
| 5,155,440 A | * | 10/1992 | Huang | 324/539 |
| 5,168,237 A | * | 12/1992 | Fieau et al. | 324/542 |
| 5,185,735 A | * | 2/1993 | Ernst | 370/241 |
| 5,250,908 A | * | 10/1993 | Liu et al. | 324/542 |
| 5,302,905 A | * | 4/1994 | Crick | 324/613 |
| 5,414,343 A | * | 5/1995 | Flaherty et al. | 324/66 |
| 5,488,306 A | * | 1/1996 | Bonaccio | 324/539 |
| 5,532,601 A | * | 7/1996 | Weir et al. | 324/539 |
| 5,744,967 A | * | 4/1998 | Sorensen | 324/540 |

* cited by examiner

*Primary Examiner*—Robert Beausoleil
*Assistant Examiner*—X. Chung-Trans
(74) *Attorney, Agent, or Firm*—Irene Kosturakis; William J. Kubida; Hogan & Hartson LLP (57) ABSTRACT

A parallel data bus tester is particularly applicable to SCSI type buses, and uses a plurality of comparator circuits to simultaneously examine the voltages present on the conductors of a bus cable. For twisted pair type conductors, the tester uses a high reference voltage, which is compared to the high voltage conductor of each pair, and a low reference voltage, which is compared to the low voltage conductor of each pair. The reference voltages are adjustable, and allow each reference voltage to be swept through the expected voltage range for its respective conductors. As the level of a reference voltage crosses that of a conductor voltage being examined, a comparator that receives the reference voltage and conductor voltage changes output state. This output is used to drive a corresponding LED assigned to the conductor in question. Thus, as the reference voltage, which is compared to each of its corresponding conductor voltages (i.e., high or low), is swept through the voltage range of those conductors, the LEDs for each conductor turn on. If any of the LEDs turns on at a significantly different voltage level than the others, it indicates a potential problem with that conductor. Latch circuits for each of the comparator outputs are also provided, allowing intermittent errors to be recorded.

51 Claims, 4 Drawing Sheets

INTEGRITY TESTER FOR PARALLEL SIGNAL BUS

FIELD OF THE INVENTION

This invention relates generally to parallel data buses and, more particularly, with properly testing the integrity of such buses.

BACKGROUND OF THE INVENTION

High speed parallel data busses, such as those used to implement the Small Computer System Interface (SCSI) standard, are typically made up of many parallel signal transmission line conductors combined into a single cable or printed circuit backplane. For example, current sixteen-bit SCSI cables have sixty-eight conductors arranged as thirty-four twisted pair transmission lines. Twenty-seven of these pairs are used to carry data and control signals, while the remainder is used for power and ground. Terminators are used at each end of the bus to prevent signal reflection and to hold each signal line at a specified voltage level when it is not being driven.

Because there are so many conductors in each SCSI cable, and because many such cables can be daisy-chained together to form a long SCSI bus, such a bus can have several thousand interconnects. It is also possible to have defective, missing, or extra terminators connected to the bus. Thus, the development of electrical faults in the system, either initially or over time, is highly probable. In the past, finding electrical defects in a SCSI bus was typically done by trial and error. If a computer system was experiencing problems that could be attributed to a faulty SCSI bus interconnect, one could shut it down and replace some of the SCSI cables to see if the problem went away, repeating the procedure until the problem was solved or all the cables were replaced.

In another testing method, each cable and connector was jiggled, or otherwise stressed. This would be done while the system was running to see if an error could be deliberately induced, and detected by the system software, thereby indicating an intermittent connection. However, the timing relationship between the software and the intermittent connection would often not allow detection of the error. And even if the error was detected, several seconds might pass before it was indicated, possibly giving a false indication of the location if different regions were being stressed during that time period.

SUMMARY OF THE INVENTION

In accordance with the present invention a testing apparatus is provided for testing the integrity of a parallel data transmission device, such as an electronic bus cable or a bus terminator. The testing applies to a device having a plurality of data transmission paths on each of which a detectable signal, such as a bias voltage, may be generated. The normal bias signal, as present on one of the transmission paths, exhibits a significantly altered signal characteristic, e.g. a drop or increase in voltage level, when the transmission path is compromised. For each of the transmission paths in the device, the tester detects this type of signal alteration.

The tester includes a reference signal generator that provides a reference signal having an adjustable voltage level. The reference signal is compared to the signals on the transmission paths being tested using a comparison element, such as a plurality of comparator circuits. The comparison element identifies those transmission paths for which a signal on them has been significantly altered from what it should be. In particular, the voltage level of each different transmission path signal is compared to the reference voltage to determine if it is higher or lower.

In the preferred embodiment, the transmission paths are arranged as conductor pairs, each pair including a high voltage conductor and a low voltage conductor. Each high voltage conductor typically carries a high voltage DC signal when it is operating properly and not transmitting data. Similarly, each low voltage conductor carries a low voltage when under the same conditions. Therefore, two different reference voltages may be used, a high reference voltage that is compared to the voltages on the high voltage conductors, and a low reference voltage that is compared to the voltages on the low voltage conductors. In this embodiment of the comparison element, two comparator circuits are used per conductor pair, one for testing the low voltage conductor and one for testing the high voltage conductor.

An output mechanism, such as a plurality of LEDs, are provided to indicate which, if any, of the transmission paths were determined to have an error, based on the results of the comparison to the reference voltages. In the preferred embodiment, one LED is used per comparator, so that each conductor may be individually monitored. The reference voltages are preferably adjustable, and each of them is adjusted to sweep through a voltage range in which their respective high voltage conductors and low voltage conductors are expected to be. For example, the high reference voltage may be set at a value below any voltage expected to be present on any of the high voltage conductors, and then increased until the comparators for each of the high voltage conductors begin to switch output states, as the reference voltage surpasses the voltages on those conductors. If any of the comparators switches at a significantly different voltage level than a majority of the others, it indicates a fault with that comparators associated conductor which is causing it to carry the incorrect voltage. A similar test may be performed with the low voltage conductors by adjusting the low voltage reference.

To allow intermittent errors to be detected, the output mechanism for the tester may include latches that maintain an output state even after a detected error condition has passed. That is, if the illumination of an LED was to indicate the presence of an error on a particular conductor, the latch would hold the LED on, even if the error occurred only briefly and then passed. In the preferred embodiment, the output mechanism for the tester includes two LEDs for each conductor, one of which is latched and the other of which is not. If LEDs are arranged such that they may all be viewed simultaneously, a user may determine which of the conductors encounters an error, and under which conditions. For example, the reference voltages might be set at a level short of that ordinarily necessary to trigger an LED, and then the cable manually manipulated to induce stresses. If any intermittent errors were present on a given conductor, its corresponding non-latching LED would illuminate temporarily, while its latching LED would turn on and stay on until reset.

The tester may be used to test a bus cable, and may also be used to test a bus terminator. In either case, power is needed to establish the signals on the high and low conductors. In the preferred embodiment, the tester is capable of using the power from an existing system in which the cable is functioning, or supplying the necessary terminator power internally. An output meter may be incorporated into the tester that can display this terminator voltage, or the amplitudes of the reference voltages. In one embodiment, the tester also includes an audio indicator, such as a beeper, that gives an audio indication of the detection of an error.

In one embodiment of the invention, the tester is also capable of testing for a short circuit between conductors on a bus. In this embodiment, a control device is used to induce an error in the conductors of one pair, while disabling its output indicators. Meanwhile, since the other output indicators are not disabled, any short circuit to the conductor of another pair would result in that other conductor also showing an error. However, since the outputs of that other conductor pair are not disabled, the error would be detected. Preferably, the tester cycles through the conductor pairs, selectively forcing each of them to an error state while simultaneously disabling its outputs. If this technique is then combined with the use of latches in the output mechanism, any short circuit errors recorded during the sequencing of the conductor pairs would be detected.

DETAILED DESCRIPTION OF THE PREFERRED EMBODIMENT

Figure 1:
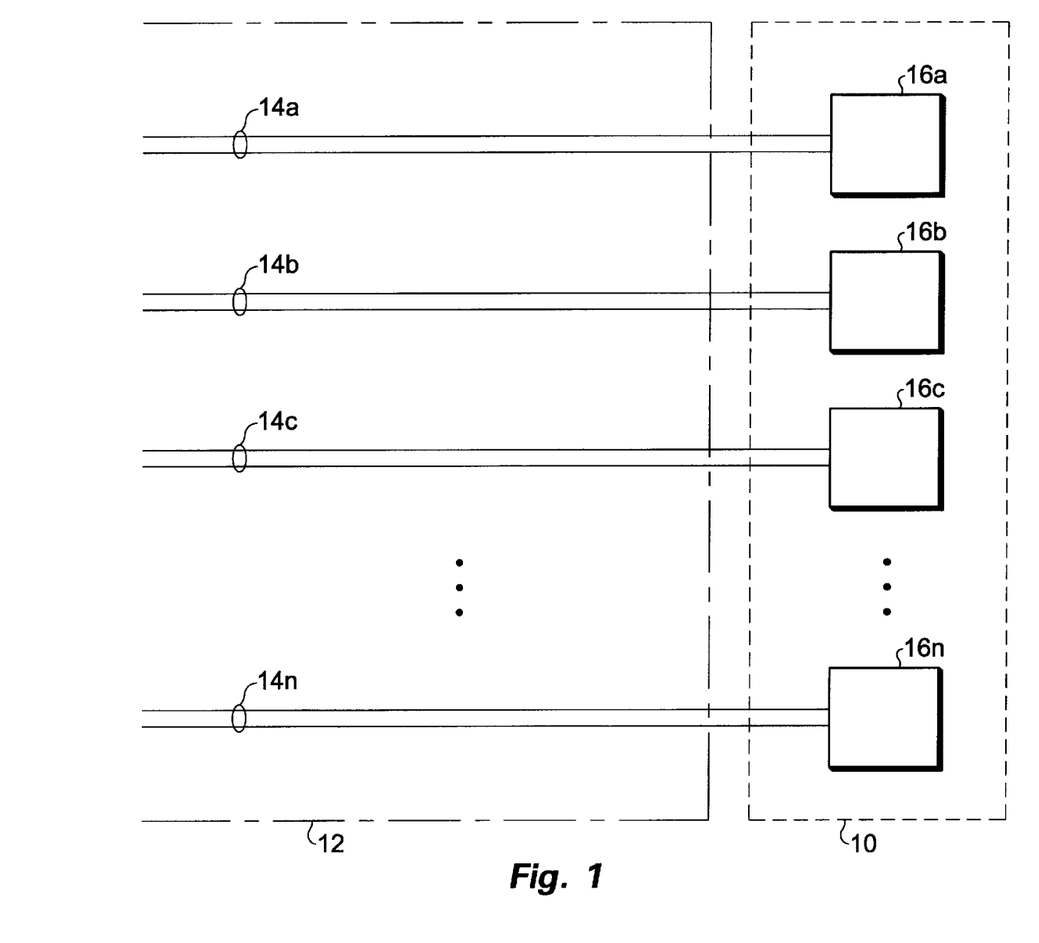
FIG. 1 is a schematic overview of a parallel bus cable and a bus tester according to the present invention.

Shown in FIG. 1 is a schematic representation of a bus cable tester 10 in accordance with the present invention. The tester 10 is shown connected to a bus cable 12 that may be, for example, a bus cable that complies with the SCSI standard. The cable 12 includes a plurality of conductor pairs 14a–14n which, in a standard SCSI cable, are "twisted pairs," as is known in the art. For purposes of clarity, only a few of the conductor pairs are shown in the figure. However, those skilled in the art will recognize that the cable will typically have many more conductors than shown. When the cable is connected to the tester 10, each of the conductor pairs 14a–14n, makes electrical contact with a respective one of a plurality of test circuits 16a–16n. Each of these test circuits is functionally identical, and a representative one of them is shown in more detail in FIG. 2.

Figure 2:
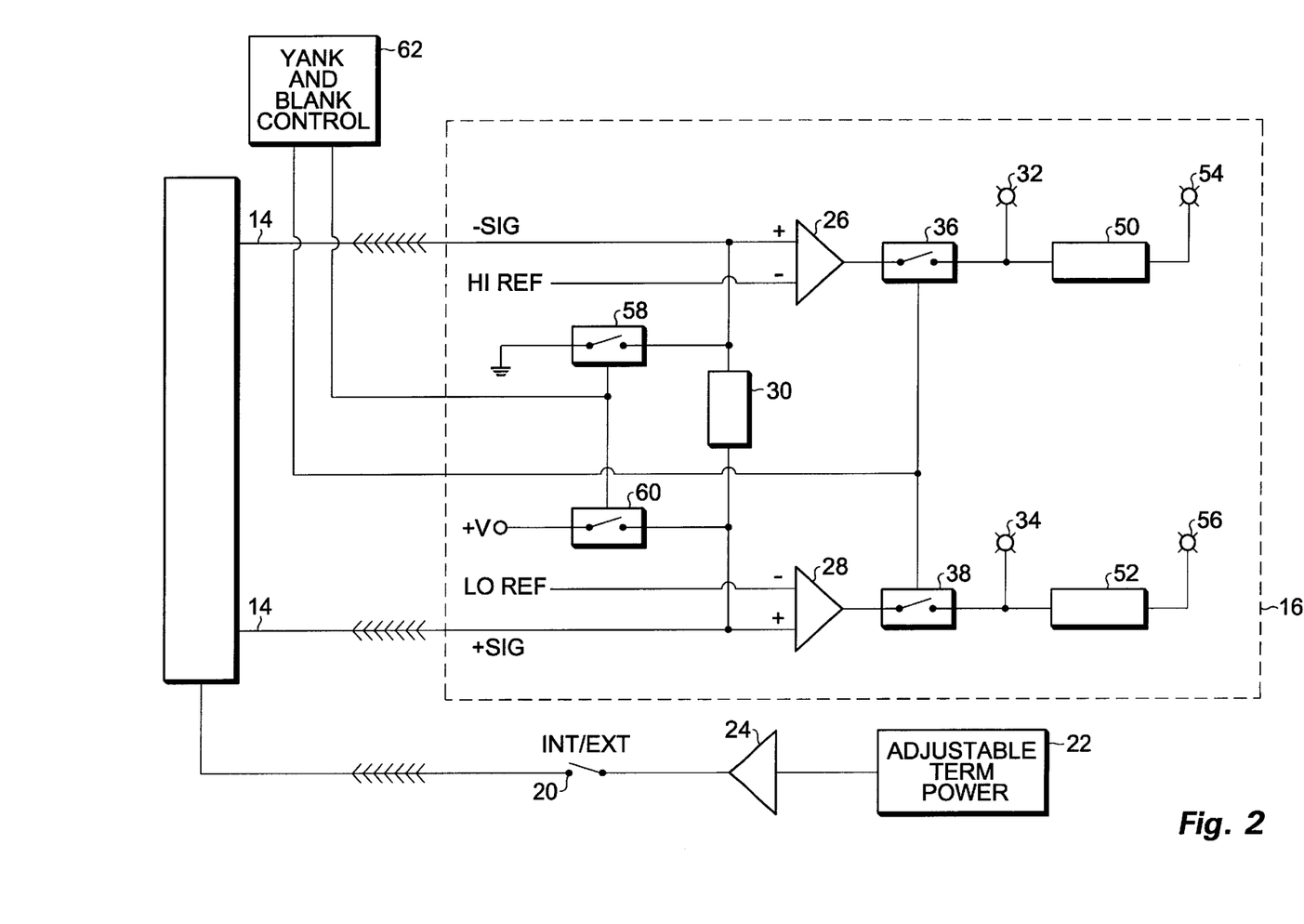
FIG. 2 is a more detailed schematic view of a test circuit used with the tester of FIG. 1.

The test circuit shown schematically in FIG. 2 is any one of the test circuits 16a–16n of FIG. 1, and is therefore denoted generally by the numeral 16. Likewise, the particular conductor pair shown in the figure is labeled 14. Also depicted in FIG. 2 is a terminator for the bus to which the conductors belong. The terminator may be one of several different types of terminator, depending on the mode of operation. For the SCSI protocol, the types of termination include "single-ended passive," "single-ended active," "low-voltage differential" and "high-voltage differential." The tester will work with each of these different types of termination, and can be used with either the external power normally applied to the bus, or internal terminator power which it supplies itself. A switch 20 may be closed to allow power to be provided from an adjustable voltage source 22 that is fed through a buffer 24. When the switch is open, the voltage source 22 is prevented from interfering with the normal terminator power supply.

The signals from the conductor pair 14 are respectively labeled "–sig" and "+sig," with –sig being the higher voltage of the two, as is the convention. The tester is connected to one of the ends of the cable. These signals are also tied together with a load resistor 30 which, in the preferred embodiment, is 121 ohms. This resistor 30 causes some current to be drawn from the terminator, pulling the voltage level of –sig partially down and pulling thee voltage level of +sig partially up. The signals –gig and +gig are each input to a respective comparator 26, 28. Each of these voltages is compared to its own reference value, which serves as another input to the respective comparator. The high voltage reference value is referred to as "Hi REF" in the figures, and the low voltage reference is referred to as "LOW REF."

Each of the comparators 26, 28 is connected to a respective LED 32, 34 which, when powered, provides a visual indication of that particular comparator output. The output of comparator 26 is connected to LED 32 via switch 36, while the output of comparator 28 is connected to LED 34 via switch 38. The switches 36, 38 control whether the LEDs are active, and are discussed in more detail hereinafter. The reference voltage of the testing circuit 16 are used to control the thresholds at which the input signals are compared. Through modification of these reference voltages, the values of –sig and +sig can be determined.

Figure 3:
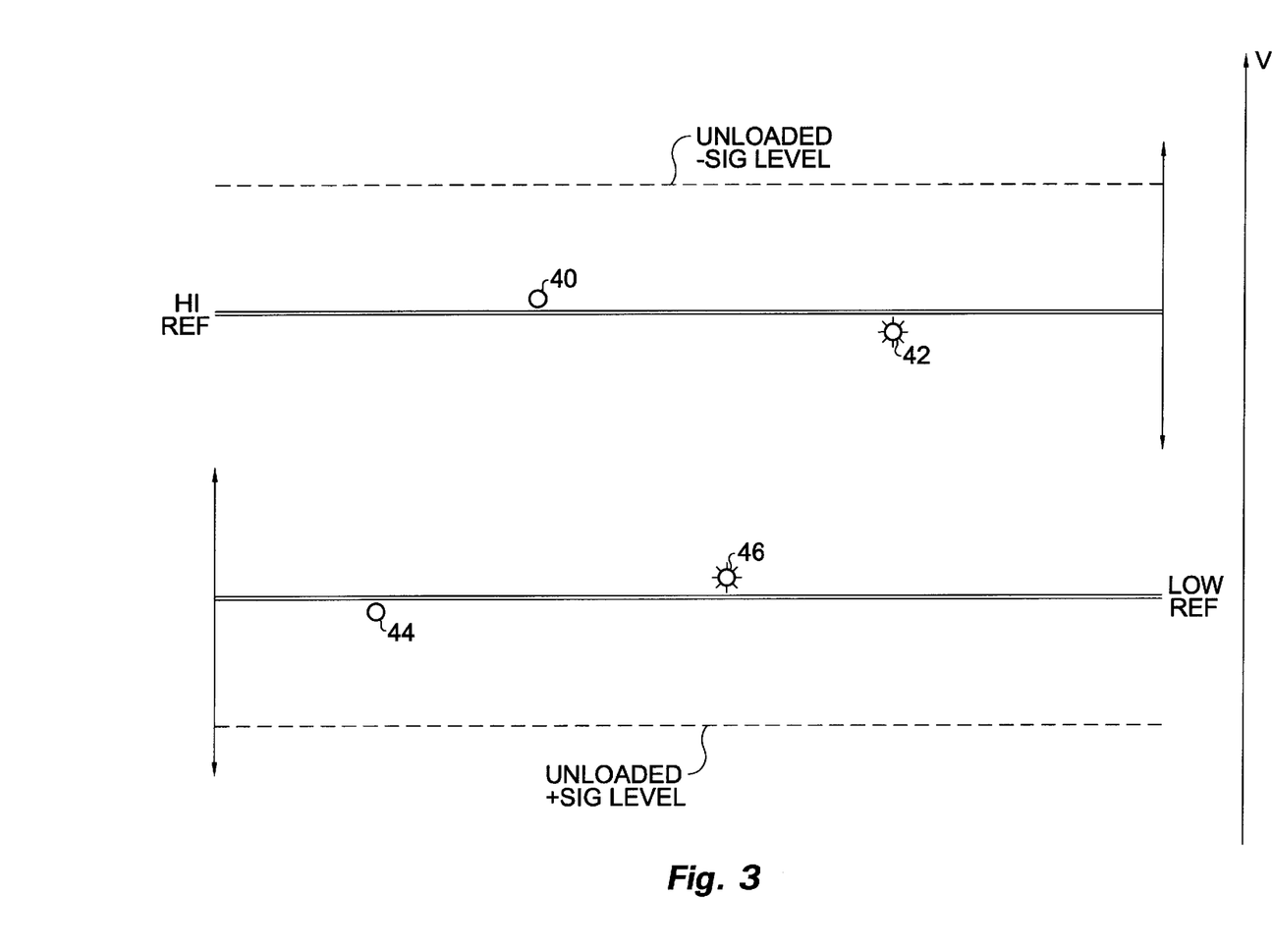
FIG. 3 is a graphical depiction of the reference voltages used with each test circuit of FIG. 2, and the manner in which their voltage levels effect the detection of errors on conductors in the bus cables.

FIG. 3 is a representation of the high and low reference voltage levels, the high reference level being denoted "HI REF" and the low reference level being denoted "LOW REF." Each of the signal inputs –sig and +sig will have a particular voltage level when terminator power is provided, and determination of those voltage levels provides an indication of whether the conductors are functioning properly. For a –sig voltage level above Hi REF, such as a voltage at the level of point 40 in the figure, the output of the comparator 26 will maintain the LED 32 in the off state. For a –sig voltage level below HI REF, such as the voltage at the level of point 42, the output of the comparator will drive the LED 32 to the on state. Likewise, a +sig input below the LOW REF threshold (e.g., point 44) will cause the comparator 28 to keep the LED 34 in the off state, while a +sig input above the value of LOW REF (e.g. point 46) will cause the comparator 28 to drive the LED to the on state.

Also shown in FIG. 3 are dashed lines indicating the unloaded levels of –sig and +gig. The load resistor 20 (FIG. 2) brings the voltage levels of –sig and +sig closer together. Testing of the cable involves supplying the same reference voltage to all of the conductor pairs at the same time, such that each of the test circuits 16 receives the same low reference voltage and the same high reference voltage. For example, to test the high voltage signal conductors on a cable, the tester 10 is connected to the cable such that voltage Hi REF is supplied to the "HI REF" input of each of the test circuits 16. The value of Hi REF is first set at a value lower than the expected value of any of the –sig signals on the cable. It is then increased gradually. As the value of Hi REF exceeds the –sig for one of the test circuits, the comparator 26 output for that circuit changes, causing the corresponding LED 32 to be illuminated. Eventually, Hi REF will increase beyond the voltage level of each of the –sig values, and all of the LEDs 26 will be illuminated. If the cable is functioning properly, the Hi REF voltage level at which the LEDs turn on will be close to the same for all of the different conductor pairs. When one of the LEDs turns on well before or well after a majority of the others, it indicates a problem with the conductor pair that carries that particular –sig voltage.

The testing of the +sig signals is similar to that described above, except that the low reference voltage, LOW REF, is used. The tester is connected to the cable being tested, such that each of the +sig signal lines on the bus is input to one of the test circuits 16. Since the low reference signal is connected to the "LOW REF" input of each of the test circuits, the change in this reference affects all of the test circuits simultaneously. The value of LOW REF is started well above the expected voltage level of all of the +sig signals, and gradually reduced. As with the −sig test, the LEDs 34 for the +sig test will all be illuminated within a close voltage proximity to one another if the cable is in proper working order. If one of the LEDs 34 turns on well before or well after a majority of the others, it indicates a problem with the conductor pair that is being tested by the test circuit 16 associated with that LED.

The comparator configurations differ slightly for comparator 26 and comparator 28 of each test circuit 16. To prevent oscillations in the comparator output, an external hysteresis is used. As is known in the art, an appropriately configured feedback to the positive input of the comparator prevents any oscillation noise. However, to ensure that this positive feedback does not disturb the reference voltages when the comparators change state, it is necessary to feed the reference voltages to the negative inputs of all of the comparators. This means that, as the value of Hi REF increases beyond that of −sig, the output of comparator 26 will change from a high voltage to a low voltage. Thus, to properly drive LED 32, its cathode should be connected to the output of comparator 26, while its anode is connected to a positive voltage that will drive the LED. For LED 34, the opposite is true. As the value of LOW REF drops below that of +sig, the output of comparator 28 will change from a low voltage to a high voltage. Thus, to allow LED 34 to be illuminated in response, its anode should be connected to the output of comparator 28, while its cathode is connected to ground.

Also shown in FIG. 2 are latch circuits 50, 52 and LEDs 54, 56. The input of latch circuit 50 is connected to the output of comparator 26, and its output is connected to LED 54. The input of latch circuit 52 is connected to the output of comparator 28, and its output is connected to LED 56. Each of the test circuits 16 of the tester has this set of latches and secondary LEDs, and they are used to latch the changes in the outputs of comparators 26 and 28, respectively. When one of the latches 36, 38 has been triggered, its output drives its respective LED 54, 56 to the "on" state. The output of a latch will remain in the latched state until the latch is reset. In the preferred embodiment, the latch circuits are cross-coupled NAND gates, but other types of latches may also be used. Naturally, the latches must properly respond to the different output assertion levels of comparators 26 and 28.

The usefulness of the latch circuits 50, 52 and corresponding LEDs 54, 56 is understood when considering the intermittent nature of some cable defects. If a conductor of the bus is making intermittent contact at some point, the duration of the change in the output of the corresponding comparator 26, 28 may be so brief that the illumination of the relevant LED 32, 34 goes unnoticed. If the latches 50, 52 are enabled, however, these intermittent fluctuations are indicated by the illumination of the corresponding LED 54 or 56. Thus, for example, someone using the tester may connect it to a cable being tested, and wiggle or otherwise manipulate the cable to determine whether certain intermittent faults exist. During this time, it is not necessary for the user to be viewing the LEDs 32, 34, since any changes in the outputs of comparators 26, 28 of a given test circuit will be recorded by the latches 50, 52 and LEDs 54, 56 for that test circuit. In the preferred embodiment, for each test circuit 16, the LEDS 54, 56 are a different color than the LEDs 32, 34, making visual distinction between them simpler.

A number of different types of tests may be conducted using the present invention. One test of all the conductors is done with the tester connected to a bus cable so that each of the conductor pairs is input to its own test circuit 16. First, the type of bus termination is determined, as is whether the tester will provide the terminator power. If the power is provided by a system to which the cable is attached, the terminator power switch 20 is opened. If the power is to be provided by the tester, switch 20 is kept in the closed position, and the voltage output of power supply 22 is set to the desired level. The latches 50, 52 are then disabled, and the reference voltages (Hi REF and LOW REF) are adjusted so that the LEDs 32, 34 for all of the test circuits 16 are off.

Ether the −sig conductors or the +sig conductors are tested first For the −sig conductors, the voltage level of HI REF is gradually stepped up until the LEDs 32 begin to illuminate. If any, of the LEDs do not turn on until well after the others, it indicates that the associated −sig is, at an abnormally high voltage, usually caused by an open circuit on the +sig conductor. If any of the LEDs tun on well before the others, it indicates that the associated −sig is at an abnormally low voltage, usually caused by an open circuit in the −sig conductor. Certain common types of is can be confirmed by testing the other get of conductor signals, in this case the +sig signals. The value of LOW REF is raised until all of the LEDs 34 are off. It is then gradually reduced, and the level at which the different LEDs 34 illuminate is noted.

If it is determined that the −sig and +sig signals for a given conductor pair are both at the unloaded −sig level (e.g., as shown in FIG. 3), it indicates that no current is flowing, and that the +sig wire of that conductor pair must be open. If −sig and +sig for the same conductor pair are both found to be at the unloaded +sig level, it indicates that the −sig wire of the pair is open. If both −sig and +sig of a conductor pair are closer together in voltage than the other conductor pairs, it indicates that both conductors have an unusually high resistance. Finally, if both −sig and +sig for a given conductor pair are at the same voltage level, approximately midway between their expected levels, it indicates that the two conductors are shorted together.

In addition to this basic testing technique, the latches 50, 52 of the testing circuits may be used to test for intermittent errors in the bus cable. To do this, both of the reference voltages area set close to the voltage level at which the corresponding signals reside. For example, to properly set the high reference voltage in this case, HI REF is increased until all of the LEDs 32 are illustrated. It is then reduced until all of the LEDs turn off, and thereafter by a small, fixed amount which is greater than the expected tolerance range between the −sig voltages on different conductors of a properly functioning cable. If any of the LEDs 32 do not turn off within a reasonable voltage difference from the others, it indicates a problem with the conductor par, as describe above. Once the LEDs are off, the latches 50 of all of the test circuits 16 are turned on and the cable is manually manipulated by pulling, wiggling and the like. Any intermittent contacts should register a brief change in the output of comparator 26, which is latched by latch 50, causing the illumination of LED 54. After the cable has been manipulated, the LEDs 54 that are on for the various test circuits 16 will indicate those conductors with intermittent compact errors.

The intermittent error test is normally done for both of the high and low voltage signals simultaneously. In addition to setting HI REF as described above, LOW REF will also be set so that it is higher than the signal level of the −sig voltages by an amount exceeding the expected tolerance for voltage variation between conductor pairs. The latch 52 is thereafter set, and the manual manipulation of the cable is done as discussed above. With both the reference signals properly set and the latches 50, 52 for each of the test circuits enabled, intermittent contacts for both −sig and +sig conductors will be detected simultaneously, and recorded by the LEDs 54, 56.

An additional feature in the preferred embodiment of the invention is provided to allow the system to detect short circuit defects between high level or low level signal lines of different conductor pairs. That is, if −sig of a first conductor pair was short circuited to −sig of a second conductor pair, the fault would not normally be detectable, since both lines are usually at the same voltage level anyway. However, as described below, the invention detects such errors using "yank and blank" circuits.

To test for shorts in the system, a control circuit 62 (shown in FIG. 2) is provided that sequences through all the different conductor pairs, and for a brief time for each, closes switches 58 and 60. This causes the −sig output to be "yanked down" toward the +sig level, and the +sig input to be "yanked up" toward the −sig level. The result of this brief switching of switches 58, 60 is that the outputs of comparators 36, 38 change briefly, as if to indicate an error. However, from slightly before until slightly after the switching of switches 58, 60, the switches 36, 38 are opened. Thus, the intentionally induced error is not registered by the LEDs 54, 56 of that test circuit. However, the switches 36, 38 for the other test circuits 16 are not opened. Therefore, if there are any lines from other test circuits shorted to the −sig or +sig lines of the circuit for which the "yanking" and "blanking" is performed, they will register an error, and it will be indicated by the latching on of either or both of the LEDs 54, 56 for that conductor pair.

In the preferred embodiment, a switch pair 36, 38 is opened by a pulse of approximately 32 µs generated by the control circuit 62. A pulse of 19 µs is used to close the switches 58, 60, and that pulse is generated by the control circuit 62 so that it is centered in time with regard to the pulse generated to switches 36, 38. This provides a safety margin to either side of the "yanking" pulse that ensures that the outputs for that test circuit are properly "blanked," and that no error will therefore be erroneously recorded. During the time that the tester is set in a mode for detecting such short circuit errors, the control circuit 62 cycles continuously through all of the test circuits 16 of the system. This allows a user to place the tester in this testing mode, and to thereafter manually manipulate the bus cable, thereby increasing the chance of detecting any intermittent defects.

Figure 4:
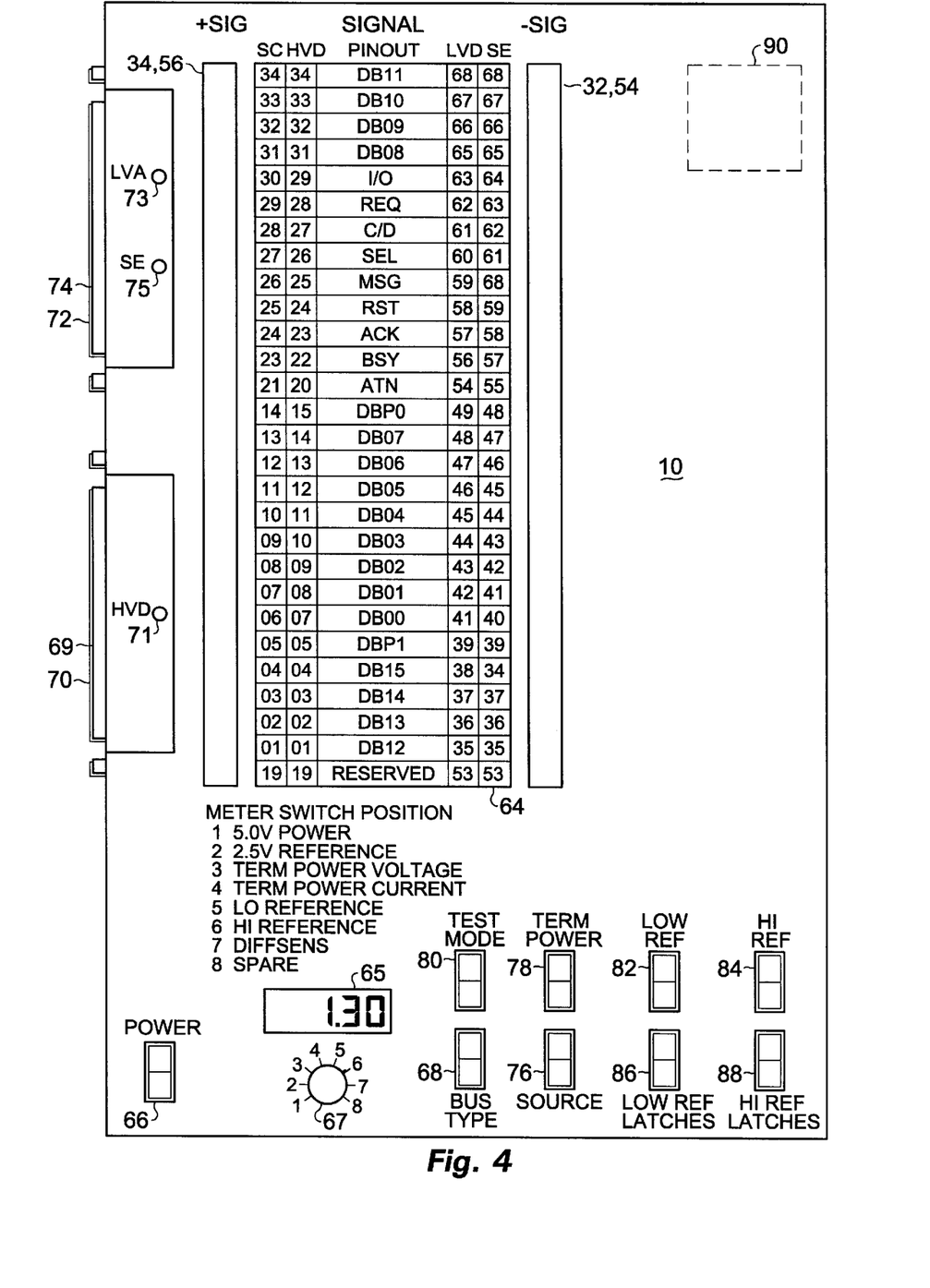
FIG. 4 is a front view of a tester unit according to a preferred embodiment of the invention.

Shown in FIG. 4 is a front view of a preferred housing for the tester 10. Although the housing may take any of a number of different forms, many advantages may be gained by the housing arrangement of FIG. 4. Two sets of LEDs are used on the front surface of the housing, one including LEDs 32 and 54, and the other including LEDs 34 and 56. The LEDs are positioned to either side of an identification label 64 that identifies the conductor pair with which each of the LEDs are associated. The terms "−sig " and "+sig" are printed above the LED groups, thus identifying whether the LEDs in the column below refer to the −sig or the +sig conductor. While the individual LEDs are not shown in the drawing, those skilled in the art will understand that there are two LEDs to the left of each row in the label 64, and two LEDs to the right. To the right of each row are the LEDs 32, 54 associated with −sig for that conductor pair, which are preferably two different colors, such as red and green. To the left of each row are the LEDs 34, 56 associated with +sig for that conductor pair, which are also two different colors. Therefore, when one of the LEDs 32, 34, 54 56 is illuminated, a user can determine which of the conductors is indicated by the adjacent row on label 64, and by whether the LED is in the −sig or the +sig column. Furthermore, the different colors in each pair of LEDs 32, 54 or 34, 56 allows the user to quickly determine whether the illumination of the LED indicates a real time error or a latched error.

In the preferred embodiment, each row of label 64 identifies a different conductor pair by both its pin number and its specific SCSI label. Since there are two possible pin assignments for a SCSI cable—one for HVD, the other for SE and LVD—there are two pin numbers listed for each +sig and each −sig on label 64. The specific type of bus is indicated at the top of each column, and the pin numbers for that type of bus are arranged below the column header, each within the appropriate row.

The tester housing is provided with a meter 65, which is used to monitor various signal levels detected by the system and output them as a numerical display, The output of the meter is controlled by control knob 67 that, when switched, changes the signal input to the meter. The different signals being measured by the meter are printed on the front of the housing, and identified by numbered settings. These settings correspond to different positions of rotatable knob 67, each of which is labeled to indicate to the user which parameter is being measured.

The tester 10 may also include an audio output device which, in the preferred embodiment, is beeper circuit 90. The beeper circuit issues an audio warning when an error is detected. This allows a user to be aware of the error without having to view the LEDs on the front of the tester housing. The beeper circuit preferably uses a voltage-controlled oscillator (VCO) and an inverter to drive opposite sides of a piezo beeper. The VCO allows the pitch of the beeper output to be changed under different circumstances. For example, the pitch of the beeper may change to reflect the number of LEDs which are illuminated.

The switch controls for the tester 10 are also shown in FIG. 4. A two-position power switch 66 allows power to the unit to be turned on and off. A "bus-type" switch 68 is preferably a rocker switch, and allows the user to cycle through the different bus types used with the tester. Four input connectors are provided, to accommodate different bus and connector types. The bus connectors include conventional "high density" connectors and newer "very high density" connectors. An upper set of connectors can be used for either LVD or SE type busses, and includes high density connector 74 and very high density connector 72. A lower set of connectors is used for HVD buses, and includes high density connector 70 and very high density connector 69. The two connectors of each set are wired in parallel, the appropriate one of a given set being selected based on the type of cable connector. To indicate the input selection made using switch 68, LEDs 71, 73 and 75 are provided on the front of the housing. These LEDs are labeled, respectively, "HVD, "LVD" and "SE," and indicate to the user which of the bus types has been selected with switch 68. When the user presses switch 68, the HI REF and LOW REF voltage ranges are shifted to match the signal levels of the selected bus type. The indicator LED indicates which connector or connectors may be used.

The source of terminator power during a test is selected using two-position switch 76. This switch corresponds to the the switch 20 shown diagrammatically in FIG. 2. If the terminator power is to be internally generated, tie terminator power output by the power source 22 of FIG. 2 may be adjusted using switch 78 (FIG. 4). This switch is preferably a rocker switch, and allows the user to incrementally increase or decrease the terminator power. In the preferred embodiment, all of the voltage adjustment rocker switches work in conjunction with "Dallastat™" digital potentiometers (produced by the Dallas Semiconductor Corp., Dallas, Tex.) The specfics of the power control circuitry for providing such stepped power control is well known in the art, and is not described herein. Preferably, the voltage increments for the tenator power are 50 mV. By set knob 67 to position three, this terminator voltage level may be monitored while it is adjusted using switch 78.

The mode in which a test is to be conducted may be changed with two-position switch 80. In a first position, the switch 80 allows for the normal testing of the conductor pairs with the "yank and blank" control circuitry 62 of FIG. 2 disabled. In a second position, the yank and blank control circuit 62 is enabled, and a short-circuit test may be done in the manner described above. The adjustment of "LOW REF" and "HI REF" is done using rocker switches 82 and 84, respectively. When adjusting LOW REF, the signal level may be monitored on meter 65 by turning knob 67 to position five. Likewise, when adjusting HI REF, the signal level may be monitored on meter 65 by turning knob 67 to position six. To enable the latches 50 or 52 of all of the control circuits 16 simultaneously, two-position switches 86 and 88 are provided. Switch 86 is used to enable or disable the +sig error latches, and switch 88 is used to enable or disable the sig error latches.

In addition to testing the bus cables, the tester 10 may be used to test terminators individually. To do so, switch 68 is pressed until the desired bus type is indicated by the appropriate LED, and a terminator is then connected directly to an appropriate connector 69, 70, 72, 74, as indicated by the illuminated LED. Knob 67 is then changed to position three, and the terminator power is adjusted to 4.95 V. The knob 67 is then moved to position four, and the output of meter 65 is observed. For SCSI terminators, the approximate output current should be 0.35 amps for single-ended, 0.18 amps for high-voltage differential, and 0.06 amps for low-voltage differential. If the output current varies significantly from the expected value, the terminator is probably defective.

The terminator is then tested for any intermittent faults in a manner similar to that described above for testing intermittent cable faults. First, the knob 67 is set to position five, and LOW REF is changed using switch 82. The value of LOW REF may be monitored on the display of meter 65, and it should be decreased until all of the corresponding LEDs 34 turn on. If any of the LEDs do not go on at approximately the same voltage level as a majority of the others, it indicates a problem with the connection line of the terminator associated with that LED. Once the LEDs are on, LOW REF is increased with switch 82 until the LEDs so off. To provide a reasonable margin of error, LOW REF is increased two voltage steps beyond the point at which all of the LEDs have turned off. In the preferred embodiment, there are sixty-three different voltage steps for each of LOW REF and HI REF, with the actual value of each step depending on the bus terminator type. For examples in high-voltage differential mode the total range is plus or minus 630 mV, so each step is 20 mV.

After LOW REF has been set, the knob 65 is set to position six, and HI REF is set by adjusting rocker switch 84. The signal level of HI REF is monitored on meter display 65, and HI REF increased until the −sig LEDs 32 turn on. If any of the LEDs turn on much earlier or later than the others, it indicates a problem with a connection path in the terminator associated with the conductor identified by that LED. Once all of the LEDs are on, HI REF is then gradually decreased until all of the LEDs turn off. The value of HI REF is then reduced by two more voltage steps to provide a reasonable margin of error.

After the reference voltages have been set, the latches 50, 62 for all of the test circuits are turned on by changing the position of switches 86 and 88. The terminator is then tested for intermittent contacts by tapping it lightly with, for example, the handle of a screwdriver. If any of the LEDs 50, 52 turn on, an error with the conductive pathways for the conductor identified by that LED is indicated.

Other tests for a terminator include determining whether a single-ended terminator is "active" or "passive." An active terminator uses a voltage regulator to maintain a particular voltage level, while a passive terminator relies strictly on resistive components. To test the terminator, the terminator voltage is reduced using switch 78 until the −sig lights begin turning on. An active single-ended terminator that is functioning properly should be expected to work down to 3.5–4.0 V before errors begin to appear. However, a passive terminator, which uses only a resistive divider to develop the −sig voltage, will begin showing errors much sooner. Similarly, a low-voltage differential terminator should function properly down to 3.0 V of terminator power. One other test of the terminator is specific to low-voltage differential and multimode terminators. By setting knob 67 to setting seven, the voltage level of the terminator "diff sense" line may be measured. When a bus cable is functioning properly, the diff sense line has a particular voltage that is dependent on the bus type, and which can be monitored by the tester. For LVD and multimode terminators, the voltage level should be between 1.2 and 1.4 V.

As shown in FIG. 4, the preferred embodiment of the tester 10 also includes several reference voltages to ensure that the device is functioning properly. Setting one for the knob 67 connects the meter to the regulated input power, which should be slightly above 5.0 V. Setting two connects the meter to a regulated reference voltage, which should be exactly 2.5 V. Finally, setting eight is reserved for future use.

The manner of testing cables has been described above with reference to FIG. 2, and those skilled in the art will understand the correlation between the circuit components of FIG. 2 and the tester controls shown in FIG. 4. While a single cable may be tested at a time (with a terminator properly connected at its far end), the tester may also be used to test the integrity of a larger portion of the bus, or the whole bus at once. Since SCSI cables are typically daisy-chained from one device to the next, there may be a number of them all connected together to form a single bus, with different devices connected in along the length of the bus cable. The tester may be connected to one end of the bus (provided a proper termination exists at the opposite end), and the tester used to detect any errors throughout the whole bus. If there is a constant error, finding the faulty cable (or cables) can be done by progressively dividing the bus into smaller sections, and retesting each section. For intermittent errors, the tester may be set up with the latches active, after which the user manually manipulate each of the bus cables one at a time. If an error is latched during the time that one particular bus cable is being moved, that cable is likely to have a defect.

While the invention has been shown and described with reference to a preferred embodiment thereof, those skilled in the art will recognize that various changes in form and detail may be made herein without departing from the spirit and scope of the invention as defined by the appended claims. For example, while the previous description has focused on SCSI busses, it will be apparent that it is equally applicable to other types of buses and parallel data transmission devices. Furthermore, the manner in which the outputs from the different tests are conveyed to the user are not particular to LEDs, and other output mechanisms may be used. Finally, the tester configuration shown in FIG. 4 is the current preferred embodiment, but other configurations may be found to be as equally effective.

What is claimed is:

1. Apparatus for testing the integrity of a parallel data transmission device having a plurality of data transmission paths on each of which a first detectable signal may be generated, the first signal, when transmitted on any of said transmission paths, exhibiting a significantly altered signal characteristic when the integrity of a transmission path on which it is transmitted is compromised, the apparatus comprising:

a reference signal generator that generates a reference signal having characteristics comparable to the first signal;

a plurality of comparison elements, each coupled to one of the transmission paths and each coupled to the reference signal generator to receive the reference signal at the same time, wherein each of the comparison elements simultaneously compares the reference signal to the first signal as generated on each of said data transmission paths, the comparison element simultaneously identifying from said comparisons the existence of said altered characteristic in any of the signals on said transmission paths; and an output mechanism which provides an indication of an error in one or more transmission paths when the comparison element identifies said altered signal characteristic as being present in the first signal as transmitted on those one or more transmission paths.

2. Apparatus according to claim 1 wherein the parallel transmission device is an electronic data bus.

3. Apparatus according to claim 2 wherein said significantly altered signal characteristic is a significant change in voltage level.

4. Apparatus according to claim 3 wherein the reference signal generator generates a reference signal that has a particular voltage level comparable to the voltage level of the first signal.

5. Apparatus according to claim 1 wherein the comparison element comprises a signal level comparator.

6. Apparatus according to claim 5 wherein the comparison element indicates whether the signal level of the first signal is higher that that of the reference signal.

7. Apparatus according to claim 6 wherein the signal level being compared is a voltage level.

8. Apparatus according to claim 1 wherein the output mechanism identifies simultaneously any of the transmission paths that have the altered signal characteristic present in the first signal as transmitted on them.

9. Apparatus according to claim 8 wherein the output mechanism comprises a visual indicator that provides a visual indication to a user of which of the transmission paths has one of said errors.

10. Apparatus according to claim 9 wherein the output mechanism further comprises a plurality of LEDs, each associated with one of the transmission paths of the transmission device, the LEDs for transmission paths having been identified as having said error being in a different switched state than those without said error.

11. Apparatus according to claim 1 wherein the reference signal generator is adjustable to allow a user to adjust the signal characteristics of the reference signal relative to those of the first signal.

12. Apparatus according to claim 1 wherein the output mechanism is capable of identifying said errors even when intermittent, such that an error is detectable after it has occurred and then discontinued.

13. Apparatus according to claim 12 further comprising a signal level indicator that can display the signal level of at least one of the signals detected by the testing apparatus.

14. Apparatus according to claim 1 wherein the data transmission device transmits electronic signals and the data transmission paths each comprise a high voltage conductor and a low voltage conductor.

15. Apparatus according to claim 14 wherein the reference signal is a first reference signal that the comparison element compares to said first signal as generated on the high voltage conductors, and wherein the reference signal generator generates a second reference signal that the comparison element compares to a second signal as generated on the low voltage conductors, the comparison element identifying an altered signal characteristic when detected on any of the high voltage or low voltage conductors.

16. Apparatus according to claim 14 wherein the output mechanism comprises a plurality of output indicators each associated with one of said high voltage and low voltage conductors.

17. Apparatus according to claim 1 further comprising a transmission path power-generating device for providing the power necessary for generating the first signal on the transmission paths of the transmission device.

18. Apparatus according to claim 1 wherein the output mechanism further comprises an audio indication of said error.

19. Apparatus according to claim 1 wherein the data transmission device comprises a bus terminator.

20. Apparatus according to claim 1 further comprising an improper connection testing mechanism that forces said altered signal characteristic to be present on a first of said transmission paths, such that the error is reported by the output mechanism with respect to any other transmission path that may be improperly connected to said first path.

21. Apparatus according to claim 20 further comprising an output disabling mechanism that disables the output mechanism such that it does not indicate an error with the first transmission path when said altered signal characteristic is forced on the first path.

22. Apparatus according to claim 21 wherein the improper connection testing mechanism sequentially forces an altered signal characteristic on each of the transmission paths.

23. Apparatus according to claim 22 wherein the output mechanism is capable of identifying said errors even when intermittent, such that an error is detectable after it has occurred and then discontinued.

24. Apparatus according to claim 23 wherein the output mechanism comprises a plurality of latches capable of latching any of said errors that are detected with respect to any transmission path that may be improperly connected to said first path.

25. Apparatus for testing the integrity of the conductors of a parallel data bus having a plurality of conductor pairs, each comprising a high voltage conductor and a low voltage conductor such that, when the bus is powered and functioning correctly, and no data is being transmitted on the bus, each high voltage conductor has a first voltage level and each low voltage conductor has a second voltage level, the apparatus comprising:
- a reference voltage generator that generates an adjustable low reference voltage and an adjustable high reference voltage;
- a low voltage comparing device that detects the signals on the low voltage conductors and compares them the low voltage reference signal, the low voltage comparing device identifying any of the low voltage conductors for which the signal level on that conductor is lower than the low reference signal;
- a high voltage comparing device that detects the signals on the high voltage conductors and compares them to the high voltage reference signal, the high voltage comparing device identifying any of the high voltage conductors for which the signal on that conductor is higher than the high reference signal; and
- an output mechanism that provides an indication of any of the conductors identified by the comparing devices.

26. Apparatus according to claim 25 wherein the high voltage comparing device comprises a plurality of comparator circuits each associated with one of the high voltage conductors and the low voltage comparing device comprises a plurality of comparator circuits each associated with one of the low voltage conductors.

27. Apparatus according to claim 25 wherein said indication provided by the output mechanism comprises a simultaneous indication of any of the conductors identified by the comparing devices.

28. Apparatus according to claim 25 further comprising latches for latching any identifications made by either of the comparing devices, such that an intermittent change of voltage level that causes a conductor to be temporarily identified by a relevant comparing device continues to be identified.

29. A method of testing the integrity of a parallel data transmission device having a plurality of data transmission paths, wherein the data transmission device transmits electronic signals and the data transmission paths each comprise a conductor, wherein on each of the data transmission paths a first detectable signal may be generated, the first signal, when transmitted on any of said transmission paths, exhibiting a significantly altered signal characteristic when the integrity of a transmission path on which it is transmitted is compromised, the method comprising:
- generating a reference signal having characteristics comparable to the first signal;
- simultaneously comparing the reference signal to the first signal as present on each of said data transmission paths;
- simultaneously identifying from said comparisons the existence of said altered characteristic in any of the signals on said transmission paths; and
- providing an output mechanism that gives a simultaneous indication of an error in one or more transmission paths when the comparison element identifies said altered signal characteristic as being present in the first signal as transmitted on those one or more transmission paths.

30. A method according to claim 29 wherein the parallel transmission device is an electronic data bus and the significantly altered signal characteristic is a significant change in voltage level, and wherein generating a reference signal comprises generating a reference signal that has a particular voltage level comparable to the voltage level of the first signal.

31. A method according to claim 29 wherein the data transmission device is an electronic signal bus and comparing the reference signal to the first signal as present on each of the data transmission paths comprises determining whether a voltage level of the first signal, as present on each of the data transmission paths, is higher than a voltage level of the reference signal.

32. A method according to claim 29 wherein providing an output mechanism comprises providing an output mechanism that identifies simultaneously any of the transmission paths that have the altered signal characteristic present in the first signal as transmitted by them.

33. A method according to claim 32 wherein providing an output mechanism further comprises providing an output mechanism that identifies simultaneously any of the transmission paths that have the altered signal characteristic present in the first signal as transmitted on them.

34. A method according to claim 33 wherein providing an output mechanism further comprises providing a visual indicator that gives a visual indication to a user of which of the transmission paths has one of said errors.

35. A method according to claim 29 further comprising latching the output from the output mechanism such that an identified error continues to be indicated by the output mechanism even after the error no longer exists.

36. A method according to claim 29 wherein the data transmission device transmits electronic signals and the data transmission paths each comprise a high voltage conductor and a low voltage conductor, and wherein generating a reference signal comprises generating a first reference signal that is compared to said first signal as generated on the high voltage conductors, and generating a second reference signal that is compared to a second signal as generated on the low voltage conductors, said comparisons identifying an altered signal characteristic when detected on any of the high voltage or low voltage conductors.

37. A method according to claim 36 wherein providing an output mechanism comprises providing a plurality of output indicators each associated with one of said high voltage and low voltage conductors.

38. A method according to claim 36 further comprising providing power to the transmission path necessary for generating the first signal on the transmission paths of the transmission device.

39. A method according to claim 29 wherein providing an output mechanism further comprises providing an audio indication of said error.

40. A method according to claim 29 wherein the data transmission device is a bus terminator.

41. A method according to claim 29 further comprising performing an improper connection test by forcing said altered signal characteristic to be present on a first of said transmission paths, such that the error is reported by the output mechanism with respect to any other transmission path that may be improperly connected to said first path.

42. A method according to claim 41 further comprising disabling the output mechanism temporarily such that it does not indicate an error with the first transmission path when said altered signal characteristic is forced on the first path.

43. Apparatus according to claim 41 further comprising forcing an altered signal characteristic on each of the transmission paths.

44. Apparatus according to claim 43 further comprising providing a plurality of latches capable of latching any of said errors that are detected with respect to any transmission path that may be improperly connected to said first path.

45. A method of testing the integrity of the conductors of a parallel data bus having a plurality of conductor pairs, each comprising a high voltage conductor and a low voltage conductor such that, when the bus is powered and functioning correctly, and no data is being transmitted on the bus, each high voltage conductor has a first voltage level and each low voltage conductor has a second voltage level, the method comprising:

generating an adjustable low reference voltage and an adjustable high reference voltage;

detecting the signals on the low voltage conductors and comparing them the low voltage reference signal with a low voltage comparing device, the low voltage comparing device identifying any of the low voltage conductors for which the signal level on that conductor is higher than the low reference signal;

detecting the signals on the high voltage conductors and comparing them to the high voltage reference signal with a high voltage comparing device, the high voltage comparing device identifying any of the high voltage conductors for which the signal on that conductor is lower than the high reference signal; and     providing an output mechanism that provides an indication of any of the conductors identified by the comparing devices.

46. A method according to claim 45 wherein detecting the signals on the high voltage conductors and comparing them to the high voltage reference signal with a high voltage comparing device comprises comparing the signals on the high voltage conductors to the high voltage reference signal using a plurality of comparator circuits each associated with one of the high voltage conductors, and wherein detecting the signals on the low voltage conductors and comparing them to the low voltage reference signal with a low voltage comparing device comprises comparing the signals on the low voltage conductors to the low voltage reference signal using a plurality of comparator circuits each associated with one of the low voltage conductors.

47. A method according to claim 46 wherein providing an output mechanism comprises providing an output mechanism that gives a simultaneous indication of any of the conductors identified by the comparing devices.

48. A method according to claim 47 further comprising latching any identifications made by either of the comparing devices, such that an intermittent change of voltage level that causes a conductor to be temporarily identified by a relevant comparing device continues to be identified.

49. A method according to claim 48 further comprising manually manipulating the data transmission device to induce any latent intermittent errors.

50. A method according to claim 49 further comprising adjusting the high reference voltage such that it is slightly below said first voltage level prior to manually manipulating the data transmission device.

51. A method according to claim 49 further comprising adjusting the low reference voltage such that it is slightly above said first voltage level prior to manually manipulating the data transmission device.

\* \* \* \* \*

UNITED STATES PATENT AND TRADEMARK OFFICE
CERTIFICATE OF CORRECTION

PATENT NO. : 6,341,358 B1
DATED : January 22, 2002
INVENTOR(S) : Charles Bagg and William Ham It is certified that error appears in the above-identified patent and that said Letters Patent is hereby corrected as shown below:

Column 11,
Line 53, second occurrence of "that" should read -- than --

Column 13,
Line 8, after "them" should read -- to --

Column 15,
Line 10, after "them" should read -- to --

Signed and Sealed this

Twenty-eighth Day of May, 2002

*Attest:*

*Attesting Officer*

JAMES E. ROGAN
*Director of the United States Patent and Trademark Office*